May 19, 1925. 1,538,007

J. C. SCHELLIN

VACUUM HOSE COUPLING AND MENDER

Filed Nov. 23, 1923

Inventor
John C. Schellin.
By Hiram B. Swartz Atty

Patented May 19, 1925.

1,538,007

UNITED STATES PATENT OFFICE.

JOHN C. SCHELLIN, OF WOOSTER, OHIO.

VACUUM-HOSE COUPLING AND MENDER.

Application filed November 23, 1923. Serial No. 676,642.

*To all whom it may concern:*

Be it known that I, JOHN C. SCHELLIN, a citizen of the United States, residing at Wooster, in the county of Wayne and State of Ohio, have invented a new and useful Vacuum-Hose Coupling and Mender, of which the following is a specification.

My invention relates to improvements in vacuum hose coupling and mending devices for cut or broken lines of hose, and its principal object is to provide simpler and better means for coupling what is commonly known as vacuum hose, so as to make an air tight connection, and also to afford improved means for making air tight joints between sections of such hose and mending a line of hose when cut or broken.

It consists of the novel mechanism and combination of elements hereinafter fully described, and as stated in the appended claim.

My invention is illustrated by the accompanying drawings in which similar letters and figures of reference indicate like parts.

Figure 1:
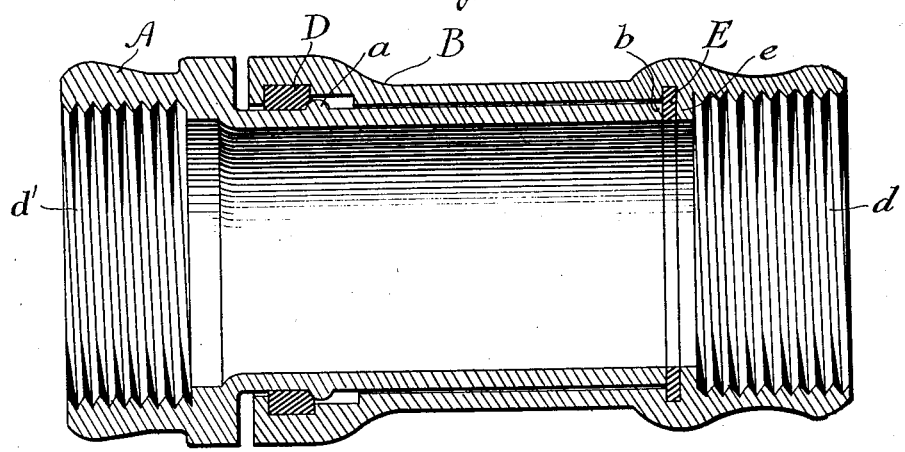

Referring thereto, Fig. 1 is a vertical longitudinal section of my improved hose coupling, enlarged, showing the interior construction and relation of the several parts thereof.

Figure 2:
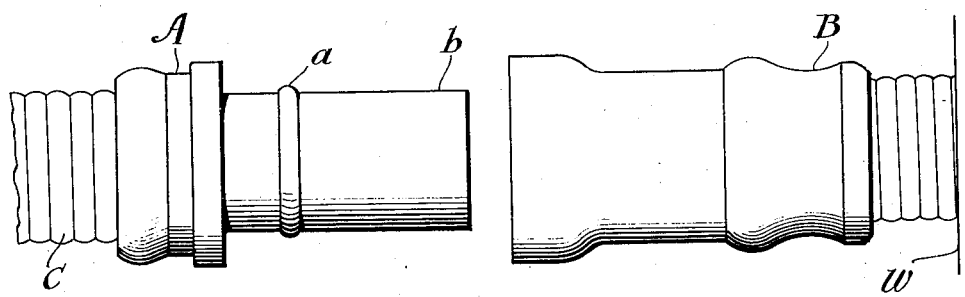
Figure 3:
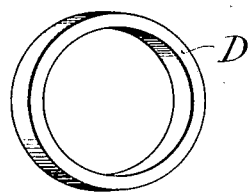
Figure 4:
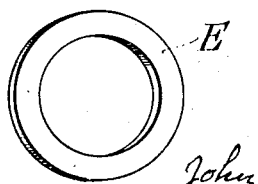

Figs. 2 and 3 are side views of the two main parts of the coupling, separated from each other; and Figs. 4 and 5 are views of the gaskets employed, as hereafter stated.

In the drawings, A is known as the male section of the coupling and B, the female portion or section thereof.

C indicates a portion of hose line attached to a section of the coupling. D is a gasket preferably of rubber or like elastic material set flatwise in an inner groove near one end of the female section of the coupling, and E is a gasket, of like material, set edgewise adjacent to the corrugated end *d* of said female section. *a* is a circular rib which surrounds the tail *b* of the male section at an intermediate point of said tail portion, adapted to engage the inner edge of the gasket D so as to compress the same along its entire periphery when a vacuum is created in the hose,—the length of the male section being such that it permits the rib to pass just beyond said compression gasket in the female section B, and when the vacuum is applied, the said rib engages the soft resilient side of the gasket D being drawn against it by suction, thus assuring an air tight joint between the sections. At the same time the inner end of the tail portion *b* abuts snugly against the side of the gasket E thereby effecting, by the natural resilience of the said abutment, a constant lateral pressure of said annular rib *a* against the circumferential resilient edge of the gasket D when said members are in coupled relation, making the joint leakproof. The connection of the two sections A and B are such as to permit rotating motion of each part upon the other, thus avoiding buckling of the hose.

This coupling can be attached at any point in length of hose line, and avoids the use of specially prepared ends to engage the sections, thus making it possible to mend a cut or broken hose line by connecting the two cut apart ends in the manner shown in Figs. 2 and 3; and in like manner, connection may be detachably made to a joint in a wall of a building, as shown at W, Fig. 3. The corrugated ends of the sections *d, d'* are adapted to engage the cut off ends of hose sections in the usual well known way.

I am aware that the use of packing rings in pipe couplings is not new, and that couplings have heretofore been constructed comprising male and female members having annular grooves, respectively, which register with each other when said members are in coupled relation, and a locking ring loosely engaging said grooves jointly, in the recess formed by the junction of said grooves, and such I do not broadly claim. Such construction is defective for want of sufficient lateral pressure of the male member against the packing ring in the female member to make the joint air tight, and the resilience of the ring being only radially exercised in the coupling and uncoupling of the members soon becomes too loose in the recess of the grooves.

I overcome this defect by providing the two annular resilient gaskets set some distance apart from each other around the inner surface of the female member, one gasket being set flatwise near the mouth of the female member to afford a resilient abutment for the circumferential rib *a*, the outer diameter of which is greater than the inner diameter of the adjacent gasket; the other gasket E being set edgewise against an annular projection at the opposite end of the female member, the distance between the two gaskets being such as to cause the inner end of the male member to abut snugly against the adjacent side of said gasket, and said rib to abut snugly against the adjacent side of the opposite gasket, as aforesaid, when the members are in coupled relation, thus making the joint absolutely leak proof, and also permitting the members to be coupled and uncoupled with ease, and also to rotate upon each other, as aforesaid.

Having thus fully described my invention, what I claim as new and desire to secure by Letters Patent is—

In a device of the character described, the combination of male and female members in telescopic relation, a pair of yieldable gaskets spaced apart from each other within the female member, and held from shifting laterally therein, and a circumferential rib around the male section, adapted to engage the inner side of one gasket when pressed therethru, and the extended inner end of the male member adapted to abut snugly against the adjacent side of the other gasket, when said members are coupled together.

Witness my hand this 20th day of November, A. D. 1923.

JOHN C. SCHELLIN.

In presence of—
  HENRY M. HUNT,
  JAMES A. LEE.